US008812945B2

(12) United States Patent
Sidon et al.

(10) Patent No.: US 8,812,945 B2
(45) Date of Patent: Aug. 19, 2014

(54) METHOD OF DYNAMICALLY CREATING REAL TIME PRESENTATIONS RESPONSIVE TO SEARCH EXPRESSION

(75) Inventors: Laurent Sidon, Los Angeles, CA (US); Charles L. Johnson, Newton, MA (US); Ronen Lasry, Burbank, CA (US)

(73) Assignee: Laurent Frederick Sidon, Los Angeles, CA (US)

( * ) Notice: Subject to any disclaimer, the term of this patent is extended or adjusted under 35 U.S.C. 154(b) by 1261 days.

(21) Appl. No.: 11/548,292

(22) Filed: Oct. 11, 2006

(65) Prior Publication Data
US 2008/0092051 A1   Apr. 17, 2008

(51) Int. Cl.
*G06F 17/00* (2006.01)

(52) U.S. Cl.
USPC .......................................... 715/202; 715/731

(58) Field of Classification Search
USPC ......... 715/201, 202, 208, 209, 234, 243, 255, 715/731
See application file for complete search history.

(56) References Cited

U.S. PATENT DOCUMENTS

| 4,716,404 | A |   | 12/1987 | Tabata et al. |
|---|---|---|---|---|
| 4,829,453 | A |   | 5/1989 | Katsuta et al. |
| 5,142,620 | A | * | 8/1992 | Watanabe et al. ............. 715/201 |
| 5,220,648 | A |   | 6/1993 | Sato |
| 5,905,988 | A | * | 5/1999 | Schwartz et al. .......... 707/104.1 |
| 6,859,909 | B1 | * | 2/2005 | Lerner et al. ................... 715/203 |
| 6,938,032 | B1 | * | 8/2005 | Heath et al. ....................... 707/2 |
| 7,010,537 | B2 | * | 3/2006 | Eyal et al. ...................... 707/100 |
| 7,010,751 | B2 | * | 3/2006 | Shneiderman ................ 715/232 |
| 7,100,123 | B1 | * | 8/2006 | Todd et al. .................... 715/862 |
| 7,356,763 | B2 | * | 4/2008 | Lin et al. ........................ 715/205 |
| 7,603,626 | B2 | * | 10/2009 | Williams et al. ............... 715/751 |
| 2002/0038299 | A1 | * | 3/2002 | Zernik et al. ....................... 707/3 |
| 2003/0088580 | A1 | * | 5/2003 | Desai et al. ................. 707/104.1 |
| 2005/0203924 | A1 | * | 9/2005 | Rosenberg .................... 707/100 |
| 2006/0129935 | A1 | * | 6/2006 | Deinlein et al. ............... 715/733 |
| 2006/0149719 | A1 | * | 7/2006 | Harris ................................ 707/3 |
| 2007/0209025 | A1 | * | 9/2007 | Jing et al. ....................... 715/968 |
| 2007/0250492 | A1 | * | 10/2007 | Angel et al. ....................... 707/4 |
| 2008/0046557 | A1 | * | 2/2008 | Cheng ............................ 709/224 |
| 2008/0235594 | A1 | * | 9/2008 | Bhumkar et al. ............. 715/738 |

FOREIGN PATENT DOCUMENTS

WO   WO 2005098677 A2 * 10/2005

OTHER PUBLICATIONS

Wohl, Michael, Editing Techniques with Final Cut Pro, Oct. 22, 2001, Peachpit Press, p. 480.*

(Continued)

*Primary Examiner* — Doug Hutton, Jr.
*Assistant Examiner* — Brian Garmon
(74) *Attorney, Agent, or Firm* — Cesari and McKenna, LLP

(57) ABSTRACT

The disclosure describes a method of dynamically creating real-time presentations responsive to search expressions. The method comprises retrieving information from search engines, parsing the retrieved information to create dynamically a structured document including mark-up tags, and rendering the structured document as a slide show presentation of images by a multimedia presentation module. The structured document may be editable, annotatable, storable, and publishable by a user viewing the slide show presentation on the client device. The information retrieved from the one or more search engines may be restricted to one or more specified web domains. Pertinent textual information about the object of interest may also be retrieved along with the image information for convenient review by the user. Each displayed image in the slideshow presentation may have an embedded hyperlink to the source page of the image.

14 Claims, 8 Drawing Sheets

(56) References Cited

OTHER PUBLICATIONS

Schneiderman, Ben, Benderson, Benjamin B., and Drucker, Steven M. Find That Photo! Interface Strategies to Annotate, Browse, and Share, Communications of the ACM, ACM, Apr. 2006, vol. 49, pp. 69-71.*

Keller, Ianus, Stappers, Pieter Jan, and Vroegindeweij, Sander, Supporting informal collections of digital images: organizing, browsing and sharing, ACM International Conference Proceeding Series, ACM, vol. 65, pp. 17-20.*

Rajani, Rakhi and Vorbau, Alex, Viewing and annotating media with MemoryNet, Conference on Human Factors in Computing Systems, CHI '04 extended abstracts on Human factors in computing systems, ACM, pp. 1517-1520.*

Google Image Search Help, http://web.archive.org/web/20041012064215/images.google.com/help/faq_images.html, archived 2004, pp. 1-4.*

Ed Bott; Woody Leonhard, Special Edition Using Microsoft Office 2003, Sep. 2003, Que, pp. 800-843.*

* cited by examiner

METHOD OF DYNAMICALLY CREATING REAL TIME PRESENTATIONS RESPONSIVE TO SEARCH EXPRESSION

CROSS-REFERENCE TO RELATED APPLICATIONS

Not applicable

FEDERALLY SPONSORED RESEARCH OR DEVELOPMENT

Not applicable

PARTIES TO A JOINT RESEARCH AGREEMENT

Not applicable

REFERENCE TO A SEQUENCE LISTING, A TABLE, OR A COMPUTER LISTING

Not applicable

BACKGROUND OF THE INVENTION

1. Field of Invention

The invention relates to the field of document presentation processing, wherein elements of electronic information (i.e., text or graphics) are gathered, associated, created, formatted, edited, prepared, and presented.

More particularly, the invention relates to a method of creating presentations by linking to relevant image sources.

2. Description of Related Art

Several commercial databases of indexed web pages on the World Wide Web are available (for example, GOOGLE® search engine, ALTAVISTA® search engine, MSN® search engine, etc.). Such databases, popularly known as search engines, are extremely popular and are used extensively by web users to search for relevant information. These days search engines are being used not only to search for textual information, but also for image information. For example, by entering appropriate keywords in a search box, "GOOGLE IMAGES™" search services will display a large collection of small-sized images to the user.

However, the limitation of the conventional way of searching for images on the search engines is that if the user finds a set of images matching his interests, he has no convenient option of saving the collection of images for his own later use or for forwarding the collection of images to his contacts. He could save the images one-by-one in a folder on his computer or he could save the images as a bookmark by clicking on each image and saving the URL as a bookmark. However, both these processes are extremely cumbersome. Saving the images one-by-one in a folder on his computer will consume a large memory space in the computer. The user can also not conveniently send the collection of images to his contacts by email, because of the heavy size of the image files. Saving the each image as a bookmark has the limitation that the logical connections and relationships between related images are not visible to the user.

Another limitation of the conventional way of searching for images on the search engines is that the images retrieved from, say "GOOGLE IMAGES™" search services, can not be conveniently organized into a meaningful collection. The information relating to each individual image has to be viewed by serially clicking the image. There is no convenient way to view all information related to the images without having to serially drill through each link.

Another limitation of the conventional way of searching for images on the search engines is that there is no convenient way to author and edit a presentation relating to a user's search interests. The conventional way also does not allow a user to annotate the images with his observations.

U.S. Pat. No. 4,716,404 discloses an image retrieval method and apparatus wherein for retrieval of a plurality of images, a sub-image of each image is specified and extracted, reference data such as memo data related to each sub-image is stored, and the sub-image and the memo data related thereto are combined and outputted as desired, thereby simplifying the retrieval of the plurality of images. Specifically, a sub-image, which is the most characteristic to each image, is extracted and combined with a memo data to thereby provide a clear clue to the image extraction. The number of specified sub-images is freely increased without rewriting original image data stored in an image file and image retrieval is settled by using a memo image and a cutout sub-image both having a less amount of data than the entire image, so that applications to a storage medium which is not rewritable, for example, an optical disc can be ensured with high response image display. However, this patent does not teach the combination of searching for images on the internet, authoring a slideshow presentation of images in real-time, and publishing the slideshow presentation to a web URL or to a database.

U.S. Pat. No. 4,829,453 discloses an apparatus for cataloging and retrieving image data is programmed to store not only image data obtained by scanning each original but also reduced image data obtained by thinning these image data and search data used for the convenience in search operations. In a search operation, a plurality of reduced image data may be displayed simultaneously or sequentially with corresponding search data. Image data may be stored in a compressed form so that an increased amount of data can be stored. The apparatus may be programmed such that stored reduced image data are sequentially displayed while a specified key is depressed and particular image data corresponding to the data displayed when the key is released are displayed. However, the patent does not teach the combination of searching for images on the internet, authoring a slideshow presentation of images in real-time, and publishing the slideshow presentation to a web URL or to a database.

U.S. Pat. No. 5,220,648 discloses software for electronically annotating electronic images, such as drawings, photographs, video, etc., through the drag-and-drop of annotations from a pre-defined, but extendable, list. The annotations are placed at a user-selected X, Y location on the image, and stored in a searchable database. Thus, they can be searched in order to retrieve, organize, group, or display desired electronic images or collections of such images. The annotations may be text, images, sounds, etc. The invention provides a flexible, easy to learn, rapid, low error rate and satisfying interface for accomplishing such tasks. However, the patent does not teach the combination of searching for images on the internet, authoring a slideshow presentation of images in real-time, and publishing the slideshow presentation to a web URL or to a database.

U.S. Pat. No. 6,859,909 discloses a system and method for annotating web-based documents. The invention allows computer users to integrate any annotation, including ink, highlighter, text-based notes and audio, directly into a Web-based document (WBD) displayed by a Web browser. This integration enables others to view the personalized annotated WBD, which retains its original active links and properties, over the Internet without the need for specialized software. Annotations are integrated into WBDs by freezing the WBD, overlaying an image file containing the annotations onto the WBD, and enabling browser events to pass through the image layer. Annotations may also be integrated into WBDs by using component object technology. The present invention collects and organizes annotated WBDs, and provides users with an intuitive Web-based interface for accessing, viewing and searching the annotated WBDs. Users may annotate blank WBDs, effectively converting their Web browsers into online notebooks/scrapbooks. The present invention also provides users with many novel interface techniques, such as dog-ears and its associated navigation tools, splitting pages, turning pages, selecting and copying various portions of a WBD (including shaking out a copy), and marking menus suited for right-handed or left-handed users. However, this patent does not teach the combination of searching for images on the internet, authoring a slideshow presentation of images in real-time, and publishing the slideshow presentation to a web URL or to a database.

U.S. Pat. No. 7,010,537 discloses a method and system for visual network searching, wherein search request is signaled over the network to a search engine. A search result is received that identifies a plurality of network addresses. Multiple pages are automatically rendered, each page being located by a corresponding network addresses in the search result. However, the patent does not create a structured document which could be rendered as a slide show presentation by a multimedia rendering software. The patent also does not teach providing an option to a user to edit and annotate the sequence of pages. The patent also does not teach providing an option to a user to save and publish the sequence of pages or to share the sequence of pages with other users.

U.S. Pat. No. 7,010,751 discloses a method for the electronic annotation, retrieval, and use of electronic images. The invention provides software for electronically annotating electronic images, such as drawings, photographs, video, etc., through the drag-and-drop of annotations from a pre-defined, but extendable, list. The annotations are placed at a user-selected X,Y location on the image, and stored in a searchable database. Thus, they can be searched in order to retrieve, organize, group, or display desired electronic images or collections of such images. The annotations may be text, images, sounds, etc. The invention provides a flexible, easy to learn, rapid, low error rate and satisfying interface for accomplishing such tasks. However, this patent does not teach the combination of searching for images on the internet, authoring a slideshow presentation of images in real-time, and publishing the slideshow presentation to a web URL or to a database.

SUMMARY OF THE INVENTION

The disclosure of the invention describes a method of dynamically creating real-time presentations responsive to search expressions. The method comprises retrieving from one or more search engines information responsive to a search expression, parsing the retrieved information to create dynamically, in real-time, a structured document including mark-up tags, and rendering, in real-time, the structured document as a slide show presentation of images by a multimedia presentation module residing in a client device. The structured document may be any document using mark-up tags, for example, HTML, XML, SGML, etc. The information retrieved from the one or more search engines may include one or more of image URLs, thumbnail URLs, source page URLs, web domain URLs, textual information, tags, metadata, and abstracts.

In an embodiment of the invention, the structured document may be editable, annotatable, storable, and publishable by a user viewing the slide show presentation on the client device. The editing capability may include, but not be limited to, the ability to select images, to add images, to remove images, to resize images, to crop images, to add layered mark-up to images, to combine one or more of the images into a single image, to change the sequence of images, to edit the transitions between images, to add audio clips to the presentation, and to blend in the presentation the images retrieved using the one or more search engines with other images or audio clips retrieved from any other source.

In another embodiment of the invention, the editing options may be manually or dynamically selected from a template-based edit decision list (EDL). In another embodiment, the editing options for the presentation may be dynamically selected based on any number of data-input/variables to another stored EDL.

In another embodiment of the invention, the presentation can dynamically translate textual information based on language setting of a client device/web browser.

In an embodiment of the invention, the annotation capability may include, but not be limited to, the ability to annotate the images with image captions or user comments. The storing capability may include the ability to store the structured document in a database. The publishing capability may include the ability to publish the structured document to a web URL so that the web URL can be shared by the user with other users and the slideshow presentation is viewable, editable, and annotatable by the other users.

In another embodiment of the invention, the information retrieved from the one or more search engines may be restricted to one or more specified web domains. The information may include information on multiple images for an object of interest. Pertinent textual information about the object of interest may also be retrieved along with the image information so that the images and the pertinent textual information are displayed together for convenient review by the user.

In another embodiment of the invention, a rollover of a mouse by a user on a search expression included in a web page triggers transmission of the search expression to the one or more search engines. In yet another embodiment, each displayed image in the slideshow presentation may have an embedded hyperlink to the source page of the image, for a user to view related information on the source page.

In another embodiment of the invention, the method of dynamically creating real-time presentations responsive to search expressions may comprise transmitting a search expression from a client device having a web browser to a web server, transmitting, in real-time, the search expression from the web server to one or more search engines, and retrieving from the one or more search engines information responsive to a search expression. The retrieved information may include one or more of image URLs, thumbnail URLs, source page URLs, web domain URLs, textual information, tags, metadata, and abstracts. The retrieved information may be parsed to create dynamically, in real-time, a structured document having mark-up tags. The structured document may be transmitted, in real-time, from the web server to the client device, and rendered, in real-time, as a slide show presentation of images by a client side multimedia presentation module.

Another embodiment of the invention discloses a system for dynamically creating customized presentations responsive to search expressions. The system may comprise a web server and a client device. The web server may include a module for creating a structured document from information responsive to a search expression retrieved from one or more search engines, a module for storing the structured document in a database on the web server, and a module for publishing the structured document to a web URL. The client device may be connectable to the web server by an internet connection, and may include an editing module for editing the structured document, an annotation module for annotating the structured document, and a multimedia presentation module for rendering the structured document as a slideshow presentation in real-time.

DETAILED DESCRIPTION OF PREFERRED EMBODIMENTS

An object of the invention is to facilitate fast and parallel review of relevant information instead of the conventional serial search from a search results page. Another object of the invention is to create automatically a flip-book style slide show presentation that allows for interesting, user-friendly, and passive review of selected images and textual information and dramatically reduces the number of user actions (clicks) required as compared with a conventional serial search. This kind of presentation may be particularly effective on internet connected small form factor mobile devices (for example, mobile phones, PDAs, etc.)

Another object of the invention is to enable a user to conveniently organize visual and textual information by automatically authoring a structured document (for example, an XML based document) so that information contained in the structured document could be rendered in different client devices (for example, a personal computer, a mobile device, a television, etc.) as a slideshow presentation. This can enable the same information to be automatically adapted for display in different client devices viewing data from across a vast number of sources.

Another object of the invention is to allow a user to edit and annotate the slideshow presentation of visual, textual, and audio information relating to a subject of interest obtained from the internet, from specific web domains, or from a user's collection and/or database. Adding relevant text over or around the image (user can determine what high-value info they want to add)—creates a compelling and informative snapshot, thus eliminating the need for excessive serial "blind" investigation of links in a convention search results page.

Another object of the invention is to allow a user to share the presentations created by him with others by saving and publishing the slideshow presentation (for example, to a web URL or to a database) and by sending the URL of the presentation to his contacts by email.

Another object of the invention is to facilitate a highly-efficient parallel search paradigm that is not bound by spatial 2D (or even 3D) constraints of the traditional page/list view and incorporates the additional dimension of time in the slide show presentation.

In the following description of various embodiments including the preferred embodiment, reference is made to the accompanying drawings, which show by way of illustration the embodiments in which the invention may be practiced. It is to be understood that other embodiments may be utilized and structural and functional modifications may be made without departing from the spirit or scope of the invention. Those skilled in the art will readily appreciate that the detailed description given herein with respect to these drawings is for explanatory purposes as the invention extends beyond these limited embodiments.

Figure 1:
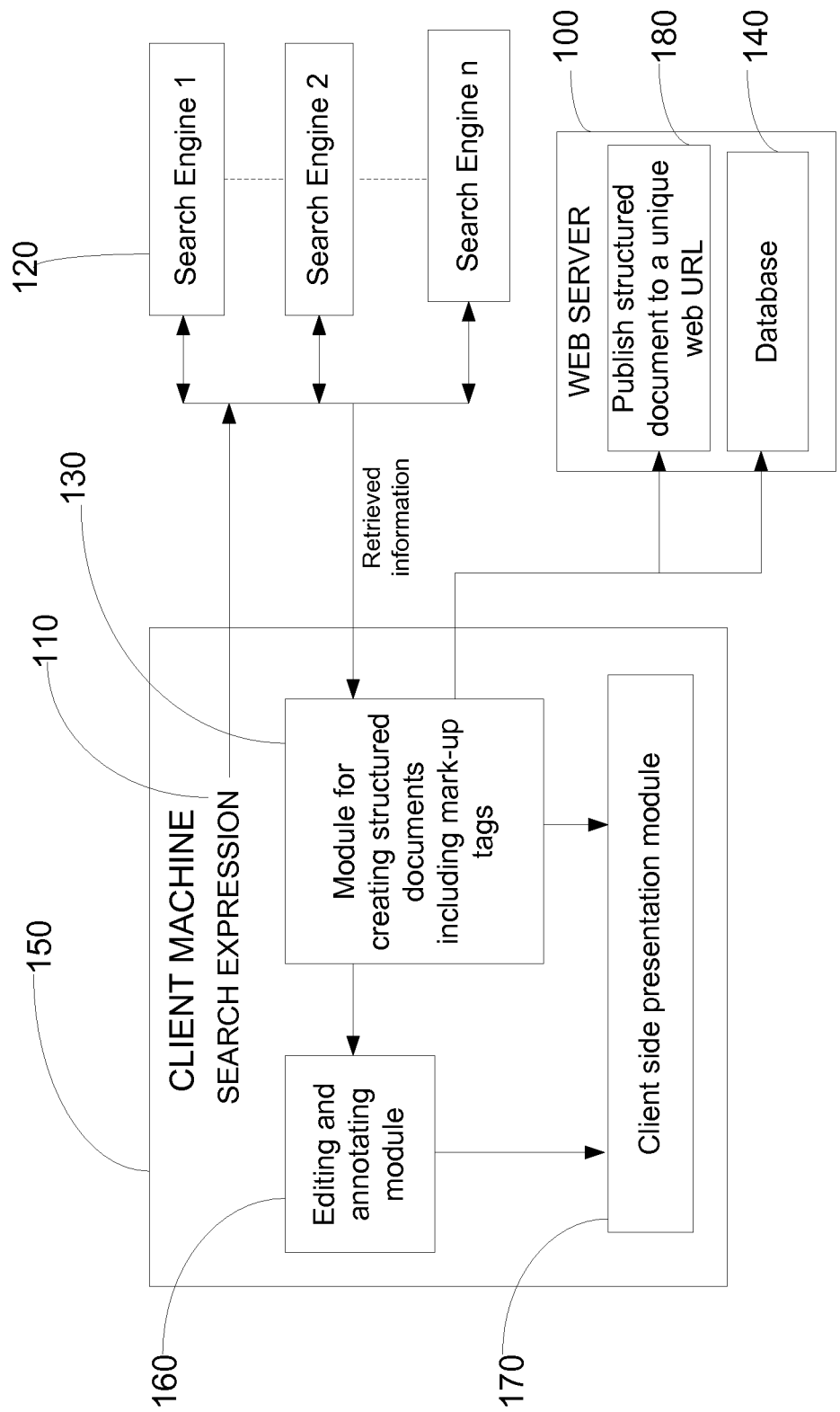
FIG. 1 shows a block diagram of an embodiment of the invention.

FIG. 1 shows a block diagram of an embodiment of the invention as disclosed herein. The embodiment discloses a client machine 150 connectable to a web server 100 and one or more search engines 120. The client machine 150 includes a module 130 for creating structured documents having markup tags, an editing & annotating module 160, and a client side presentation module 170. The web server 100 includes a module to publish structured documents to a unique web URL 180, and a module to publish structured documents to a database 140.

A user enters a search expression 110 in the client machine 150. A search expression 110 can be a particular word, phrase, or collection of words pertaining to which an image search is to be conducted. The client machine 150 can be a PC, a mobile device, a television, etc. The client machine 150 passes the search expression 110 to the search engines 120. The search engines 120 can be commercial databases of indexed web pages on the World Wide Web (for example, GOOGLE® search engine, ALTAVISTA® search engine, MSN® search engine, WIKIPEDIA® search service, FLICKR® search service, and other commercial databases (such as, travelocity.com, car.com) etc.). The search engines 120 return the information corresponding to the search expression such as, but not limited to image URLs, thumbnail URLs, source page URLs, web domain URLs, textual information, tags, metadata, abstracts and alt text, etc.

The information retrieved from the search engines 120 can be sent for conversion to the module 130 for creating structured documents having mark-up tags. The module 130 for creating structured documents converts the retrieved information into a structured document. The structured document can be a document having multiple mark-up tags. Examples of the structured document can be extensible mark up language (XML) based documents, hypertext markup language (HTML) based documents, standard generalized mark-up language (SGML) based documents, etc. The user can view the thumbnails of the images retrieved from the internet. Further, based on choice or requirement the user can edit/annotate the structured document or he can publish the structured document with or without editing. The user can publish the structured document to a unique web URL using the module for publishing structured document to a unique web URL 180 or it can be published to a database 140 (both residing on the web server 100).

If the user opts for editing and annotating the structured document, the system can send the structured document to the editing and annotating module 160 residing on the client machine 150. The editing & annotating module 160 facilitates the user to do a variety of editing tasks, for example, but not limited to, annotate, insert comments, add images, remove images, resize images, crop images, add layered mark-up to images, combine one or more images into a single image file, change the sequence of images, edit the transitions between images, add audio clips to the presentations, and blend in the presentation the images retrieved using the one or more search engines with other images or audio clips retrieved from any other source, etc.

The edited/annotated structured documents can be rendered by the client side presentation module 170 to display a slide show of images. In another embodiment, the edited/annotated structured documents can also be rendered by the client side presentation module 170 to display a formatted printable page and/or a PDF document depending upon the user's requirement. The client side presentation module 170 can be a multimedia rendering application, and/or a document rendering application. Examples of the multimedia rendering application can be a Flash player, etc. and the document rendering application can be a MICROSOFT® desktop application office tool, ADOBE® ACROBAT® READER® computer programs, etc. If the user wants, he/she can save the edited/annotated structured document to the database 140 residing on the web server 100 for future use.

Figure 2:
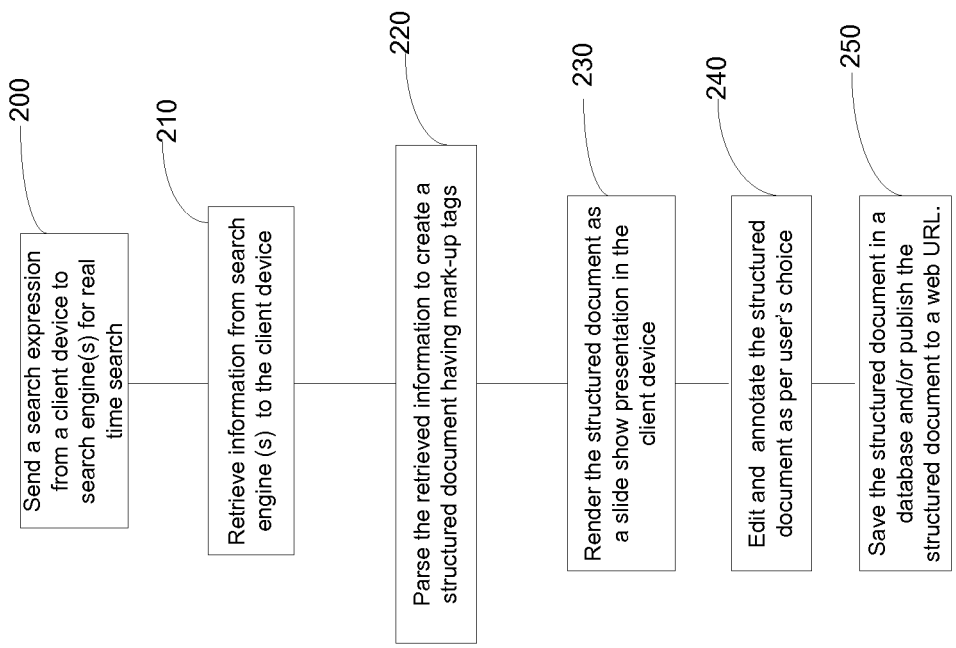
FIG. 2 shows a flow diagram illustrating the process flow of an embodiment of the invention.

FIG. 2 shows a flow diagram illustrating the process flow of an embodiment of a method of dynamically creating customized presentations corresponding to a search expression.

In step 200, a search expression can be sent to one or more search engines using a client machine for real time search. A search expression can be a particular word, phrase, or collection of words.

In step 210, the client machine retrieves the information corresponding to the search expression from one or more search engines. The information can include, but not limited to, image URLs, thumbnail URLs, source page URLs, web domain URLs, textual information, tags, metadata, abstracts and alt text, etc.

In step 220, the retrieved information can be sent to a module for creating structured documents, wherein the information can be parsed to create a structured document having mark-up tags.

In step 230, the structured document can be rendered as a slide show presentation, a formatted printable page, and/or a PDF document in the client device using a client side presentation module or the structured document can be sent to the editing and annotating module.

In step 240, the structured document can be sent for editing and annotating as per user's choice. The user can do a variety of editing and annotating tasks.

In step 250, the structured document after editing/annotating can be stored to the database or can be published to a unique web URL that can be accessed using any web browser, and/or it can be rendered as a slide show to the user.

Figure 3:
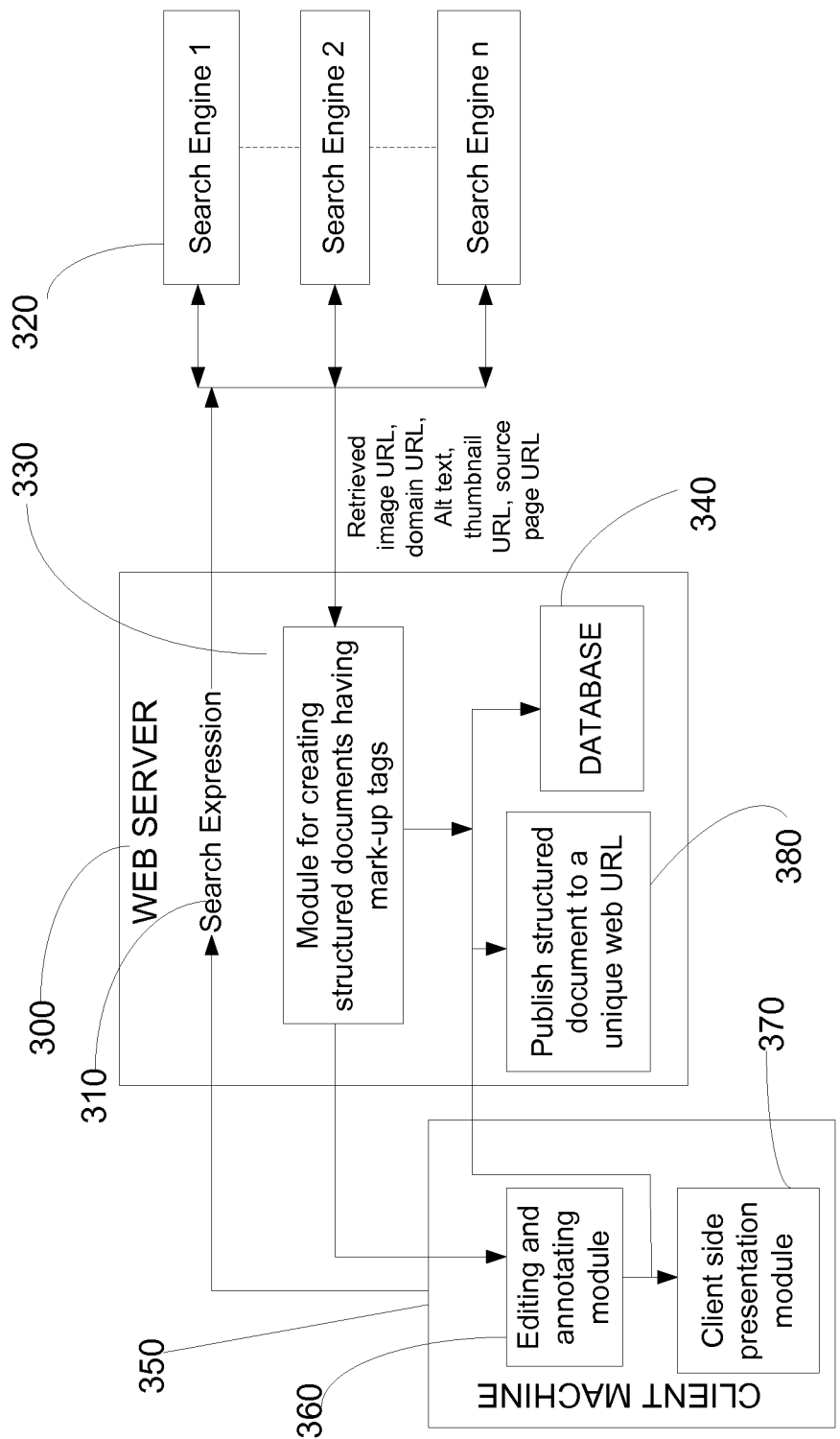
FIG. 3 shows a block diagram of another embodiment of the present invention.

FIG. 3 shows a block diagram of an embodiment of the invention as disclosed herein. The embodiment discloses a system of dynamically creating customized presentations corresponding to a search expression. The embodiment includes a web server 300 connectable with a client machine 350 and one or more search engines 320. The web server 300 includes a module 330 for creating structured documents having mark-up tags, a module 380 to publish structured documents to a unique web URL and a module 340 to publish structured documents to a database for storing purpose. The client machine 350 includes an editing & annotating module 360 and a client side presentation module 370.

A user enters a search expression 310 using the client machine 350. The client machine 350 can be a PC, a mobile device, a television, etc. The client machine 350 using a web browser sends the search expression 310 to the web server 300. The web server 300 can be any computer, which is responsible for accepting HTTP requests from the web browser on the client machine 350 and responding to the HTTP requests and serving back to the web browser the required information.

The web server 300 passes the search expression 310 to the one or more search engines 320. The one or more search engines 320 return the information corresponding to the search expression 310. The information can include, but not be limited to, image URLs, thumbnail URLs, source page URLs, web domain URLs, textual information, tags, metadata, abstracts and alt text, etc.

The information retrieved from the one or more search engines 320 can be sent to the module 330 for creating a structured document having mark-up tags. The structured document can be a document having multiple mark-up tags. Examples of structured documents can be extensible mark up language (XML) based documents, hypertext markup language (HTML) based documents, standard generalized mark-up language (SGML) based documents, and the like.

The structured document may be edited and annotated by a user using the editing & annotating module 360 residing on the client machine 350. The user may publish the structured document to a unique web URL 380, or to a database 340 residing on the web server 300 depending upon his/her choice. The editing & annotating module 360 enables the user to do a variety of editing and annotating tasks, for example, but not limited to, annotate, insert comments, add images, remove images, resize images, crop images, add layered mark-up to images, combine one or more images into a single image file, change the sequence of images, edit the transitions between images, add audio clips to the presentations, and to blend in the presentation the images retrieved using the one or more search engines with other images or audio clips retrieved from any other source, etc. The structured document can be rendered by the client side presentation module 370 to display a slide show of images before or after sending the structured document to the editing and annotating module. The structured document can also be displayed as a formatted printable page and/or a PDF document depending upon the user's requirement. The client side presentation module 170 can be a multimedia rendering application, and/or a document rendering application. Example of the multimedia rendering application can be a Flash player, etc and the document rendering application can be a MICROSOFT® desktop application office tool, ADOBE® ACROBAT® READER® computer programs, etc. The structured document can be published to a unique web URL or it can be saved to the database 340 for future use.

Figure 4:
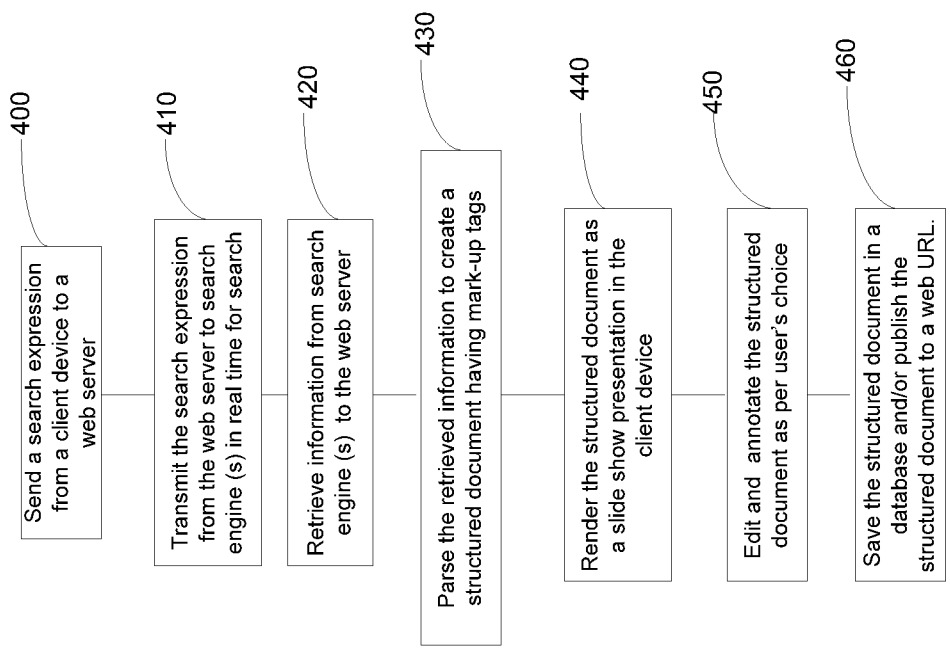
FIG. 4 shows a flow diagram illustrating the process flow of another embodiment of the present invention.

FIG. 4 shows a flow diagram illustrating the process flow of a method of dynamically creating customized presentations corresponding to a search expression.

In step 400, a search expression can be sent to a web server using a client machine. A search expression can be a particular word, phrase, or collection of words.

In step 410, the search expression can be transmitted from the web server to one or more search engines for real time search.

In step 420, the web server retrieves the information corresponding to the search expression from the one or more search engines.

In step 430, the retrieved information can be sent to a module for creating structured documents, wherein the retrieved information can be parsed to create a structured document having mark-up tags.

In step 440, the structured document can be rendered as a slide show presentation, a formatted printable document and/or a PDF document in the client device using the client side presentation module and/or it may be sent to an editing and annotating module.

In step 450, the structured document can be sent for editing and annotating as per user's choice.

In step 460, the structured document after editing/annotating can be stored to the database or can be published to a unique web URL that can be accessed using any web browser, and/or it can be rendered as a slide show, a formatted printable document and/or a PDF document to the user.

Figure 5:
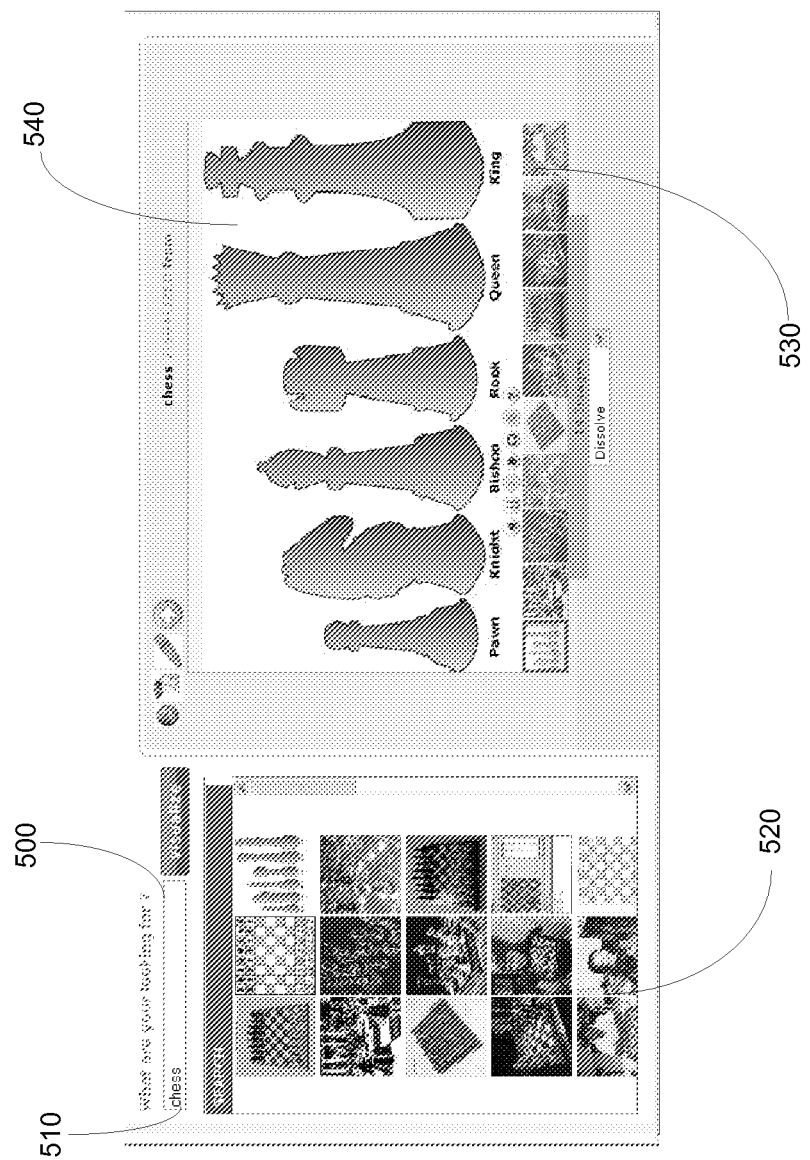
FIG. 5 shows an embodiment of a user-interface on a client device, disclosing an embodiment of the invention.

FIG. 5 shows an embodiment of a user-interface on a client device, disclosing a user-interface for dynamically authoring customized presentations corresponding to a search expression. The embodiment includes a search box 500 in which a user can input a search expression 510. The search expression 510 can be sent to one or more search engines for real time search. The one or more search engines provide desired information such as, but not limited to, image URLs, thumbnail URLs, source page URLs, web domain URLs, textual information, tags, metadata, abstracts, and alt text, etc. corresponding to the search expression 510. A web browser residing on the client device can display thumbnails of images in the form of a thumbnail gallery 520 to the user. The user can select a set of thumbnails 530 from the thumbnail gallery 520 using any one of several methods such as drag-and-drop method, click to select method, etc.

The information retrieved from the one or more search engines for the selected set of thumbnails can be sent to a module for creating a structured document (not shown) having mark-up tags. The module for creating structured documents converts the information corresponding to the selected set of thumbnails into a structured document. The structured document can be rendered by the client side presentation module (not shown) to display a slide show presentation 540 on the user-interface. The method enables the user to view the complete slideshow of selected and ordered images without having to serially drill the link for each image.

Figure 6:
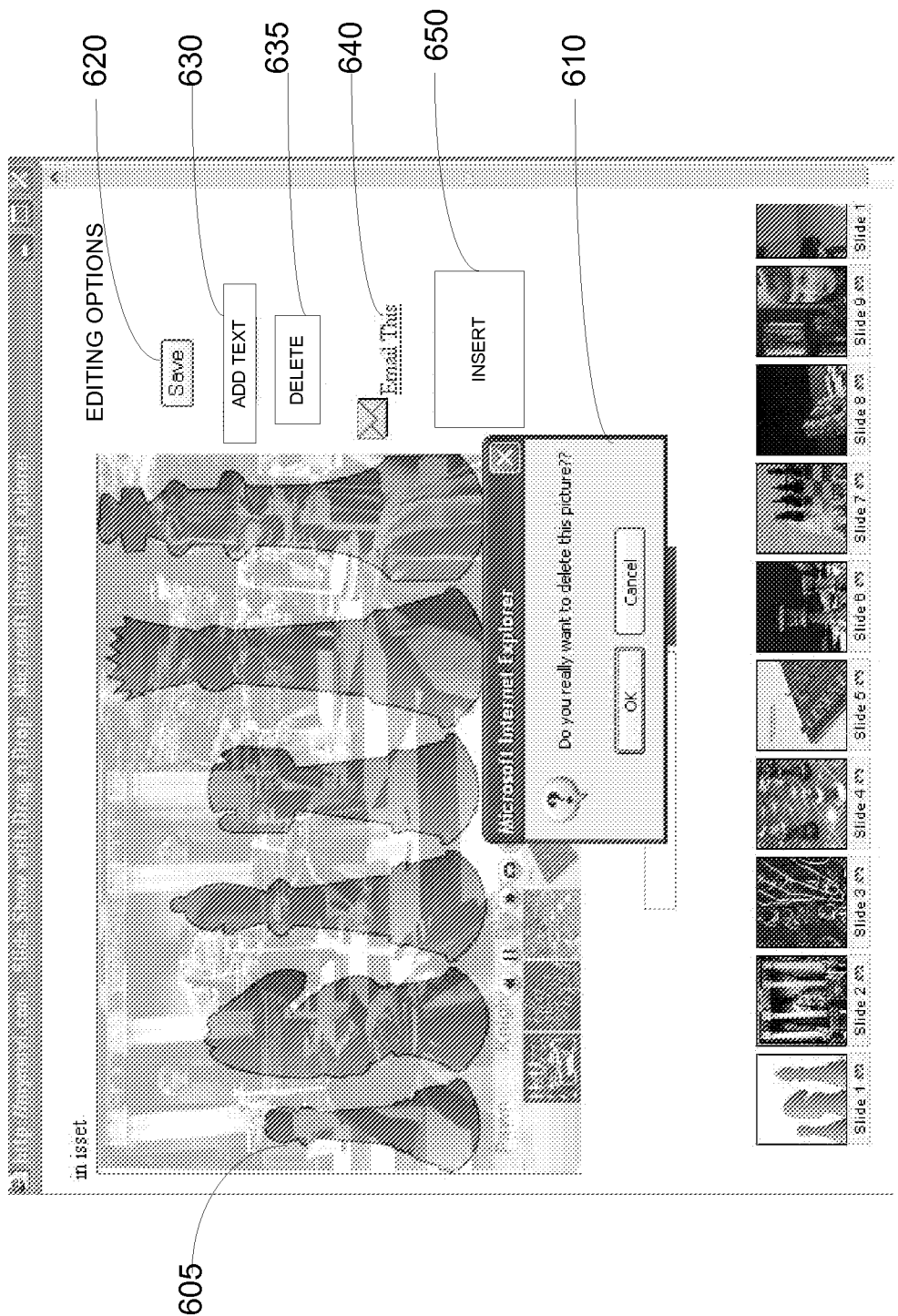
FIG. 6 shows an embodiment of a user-interface on a client device, disclosing another embodiment of the present invention.

FIG. 6 shows an embodiment of a user-interface showing a few options for editing/annotating a slide show presentation 605 of selected images corresponding to a structured document. The embodiment discloses a user interface with several editing/annotating options. The slide show presentation 605 can be displayed to the user. The user can be provided with several editing options such as, but not limited to, "save" 620, "add text" 630, "delete an image" 635, "E-mail" 640, "insert an image" 650, etc. For example, the user can use the editing option "delete an image" 635 to delete an image from the slide show presentation. The editing & annotating module before implementing any instruction seeks confirmation 610 from the user's end. The user can use the editing option "Add Text" 630 to annotate each image of the slide show presentation. Similarly, the user can use the editing option "save" 620 and publish the structured document (not shown) to a database (not shown) residing on a web server (not shown). After completion of editing and annotating, the user can use the option "e-mail" 640 to send the saved structured document (not shown) to his contacts. It is to be understood that all the editing options basically modify the structured document. The slide show presentation displays the changes to the user when the modified structured document is rendered by a client side presentation module (not shown).

Figure 7:
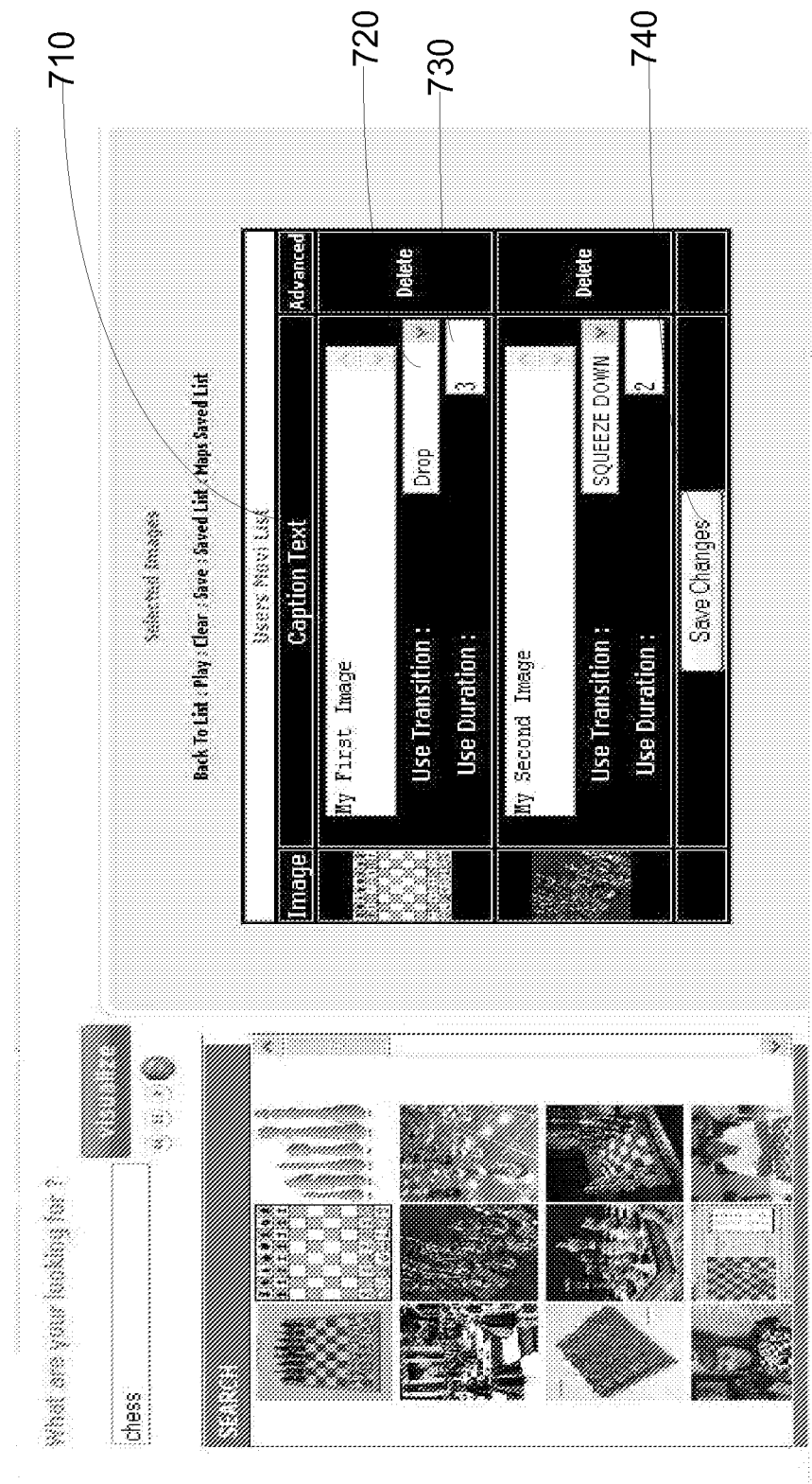
FIG. 7 shows an embodiment of a user-interface on a client device, disclosing yet another embodiment of the invention.

FIG. 7 shows an embodiment of a user-interface for some other editing options (not a complete list of editing options) for a slide show presentation corresponding to a structured document. The embodiment discloses some editing options such as "add caption text" 710, "transition mode" 720, and "time duration" 730, etc. A user can use the editing option "add caption text" 710 to add details such as image name, user comments, etc. to images displayed in the slideshow presentation. The user can use the editing option "transition mode" 720 to change the transition style between consecutive images of the slide show presentation. Examples of "transition mode" can be "drop", "squeeze down", "squeeze up", "move left", "move right", etc. Similarly, the user can use the editing option "time duration" 730 to variate the time interval between the transitions of images. All the changes can be saved in a structured document using a "Save Changes" 740 option. It is to be understood that all the editing options basically modify the structured document. The slide show presentation displays the changes to the user when the modified structured document is rendered by a client side presentation module (not shown).

In a conventional search system, search results entirely depend upon the formation of search expressions. Variation of single word in a search expression may lead to entire new set of search results. Thus, to facilitate a user, the embodiment discloses an alternative way of forming a search query, which can be termed as a rollover search expression. In the rollover search expression as the user's mouse will roll over a suggested search phrase, an automatic search query is generated, which will yield search results from search engines.

Figure 8:
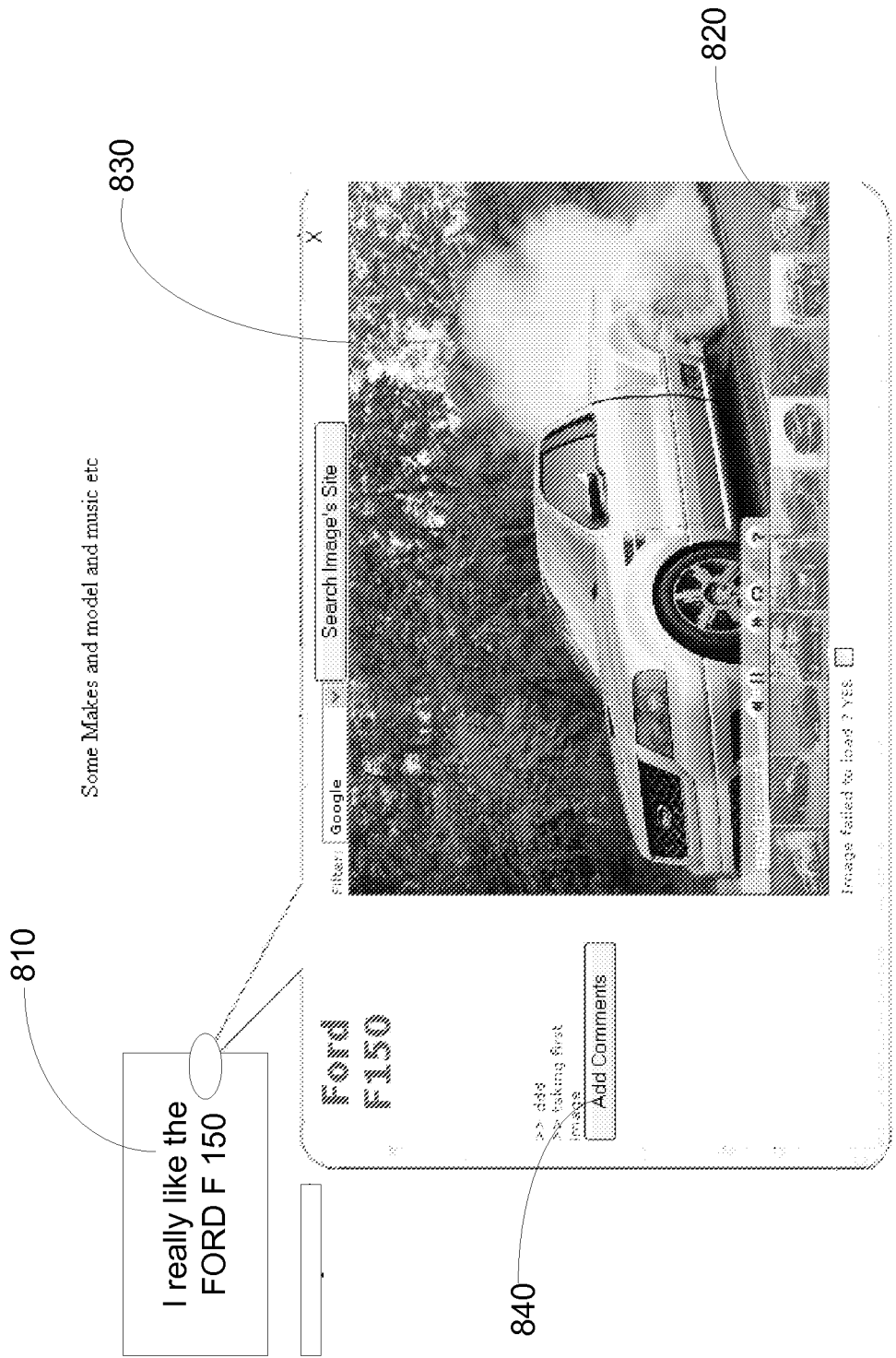
FIG. 8 shows an embodiment of a user-interface on a client device, disclosing an embodiment of the invention.

FIG. 8 shows an embodiment of a web page in which some of the search expressions are part of the text of the web page, and the web page is programmed such that when a user's mouse will roll over say the search expression 810 ("Ford F 150" in this example), an automatic search query is generated corresponding to the search expression 810, and information related to the search expression 810 "Ford F 150" can be retrieved from one or more search engines and/or specific web domains. A set of thumbnails 820 corresponding to the search expression is displayed to the user as a thumbnails galley. The user selects some images from the thumbnails galley. A structured document corresponding to the selected images is created which can be rendered as a slide show presentation 830 by a client side presentation module and displayed to the user. The user can use an editing option "add comments" 840 to add comments to each image.

Having fully described the preferred embodiment, other equivalent or alternative methods of retrieving information, creating structured documents, editing and annotating the structured documents, rendering the structured documents as slide show presentations by a rendering software, and publishing the documents according to the present invention will be apparent to those skilled in the art. The invention has been described above by way of illustration, and the specific embodiment disclosed is not intended to limit the invention to the particular forms disclosed. For example, the embodiments described in the foregoing were directed to providing you clear ideas about the preferred modes, including the best mode, of making and using the present invention; however, in alternate embodiments, those skilled in the art may implement the invention using various other means without deviating from the central idea of the invention. The invention therefore covers all modifications, equivalents, and alternatives falling within the spirit and scope of the following claims.

We claim:

1. A method of dynamically creating a multimedia presentation responsive to search results, comprising:

transmitting, in real-time, a search expression from a first user on a client device having a web browser to one or more search engines;

retrieving at least two search results from the one or more search engines responsive to the search expression, the at least two search results including both images and text corresponding to the search expression;

automatically parsing the retrieved search results to create, in real-time, a structured document containing an Edit Decision List (EDL) that defines a linear sequence across temporal space for presenting two or more of the images;

rendering the structured document as the multimedia presentation on a client device using the EDL;

obtaining input from the first user indicating revised editing options that represent changes to the linear sequence across temporal space for presenting the graphical images and text, and storing the revised editing options as a revised EDL; and enabling the first user to upload the structured document with the revised EDL to be shared with at least one second user, thereby making available to the at least one second user the ability to retrieve the structured document from said web server and to operate on the structured document to further edit, annotate, store, and re-publish the structured document by making further edits to the revised EDL.

2. The method of claim 1 wherein the search expressions are generated by a user on a client device using a rollover device to select an image from the multimedia presentation and to thereby automatically generate a further search query corresponding to a hyperlink specified in the structured document that is associated with the selected image.

3. The method of claim 1 wherein the structured document further comprises a first area containing the linear sequence of images and a second area containing an image selected from the linear sequence of images and an adjacent user control enabling a user viewing the structured presentation to initiate a search of a site from which the selected image was retrieved.

4. The method of claim 1 wherein the structured document contains a further module enabling a user to create a second structured document by selecting a subset of the images in the linear sequence of images.

5. The method of claim 1 wherein the second structured document indicates the subset of the images as an Edit Decision List.

6. The method of claim 1 wherein the editing option included in the structured document enables editing of an Edit Decision List.

7. The method of claim 1 wherein the editing option is a user-activated button.

8. A method of dynamically creating a multimedia presentation responsive to search results, comprising:

retrieving at least two search results from one or more search engines driven by a search expression derived from user input, the at least two search results including at least text and graphics corresponding to the search expression;

automatically converting the at least two search results into a structured document, the structured document compiled to include markup tags containing two or more image elements selected from the search results as a multimedia presentation specifying a linear sequence across temporal space of the two or more images, said markup tags of the structured document further including hyperlinks to the image elements comprising the multimedia presentation;

further configuring the structured document to include an editing option tag within the structured document representing an editing option input control and associated annotation module that allow a user viewing the multimedia presentation on the client device to further operate on the structured document by activating the editing option to add annotations to the structured document;

publishing the structured document by uploading the structured document with the editing option tag to a web server accessible to a second user; and the second user retrieving the structured document from said web server, the second user further activating the editing option within the structured document to provide further annotations to the structured document, and re-publish the structured document with the further annotations provided by the second user.

9. The method of claim 8 wherein the search expressions are generated by a user on a client device using a rollover device to select an image from the multimedia presentation and to thereby automatically generate a further search query corresponding to the hyperlink associated with the selected image.

10. The method of claim 8 wherein the structured document further comprises a first area containing the linear sequence of images and a second area containing an image selected from the linear sequence of images and an edit module user control enabling a user viewing the structured presentation to initiate a further search of a site from which the selected image was retrieved.

11. The method of claim 8 wherein the structured document contains an editing module further enabling a user to create a second structured document by selecting a subset of the images in the linear sequence of images.

12. The method of claim 11 wherein the second structured document indicates the subset of the images as an Edit Decision List.

13. The method of claim 8 wherein the editing option included in the structured document enables editing of an Edit Decision List.

14. The method of claim 8 wherein the editing option is a user-activated button.

* * * * *